Aug. 21, 1923.

G. J. McLAIN

CONCRETE MOLD

Filed Oct. 2, 1922

1,465,782

Inventor:
George J. McLain

Patented Aug. 21, 1923.

1,465,782

UNITED STATES PATENT OFFICE.

GEORGE J. McLAIN, OF LOS ANGELES, CALIFORNIA.

CONCRETE MOLD.

Application filed October 2, 1922. Serial No. 591,885.

*To all whom it may concern:*

Be it known that I, GEORGE J. McLAIN, a citizen of the United States, residing at Los Angeles, county of Los Angeles, and State of California, have invented a new and useful Concrete Mold, of which the following is a specification, reference being had to the accompanying drawings, forming part hereof, in which—

Figure 1:
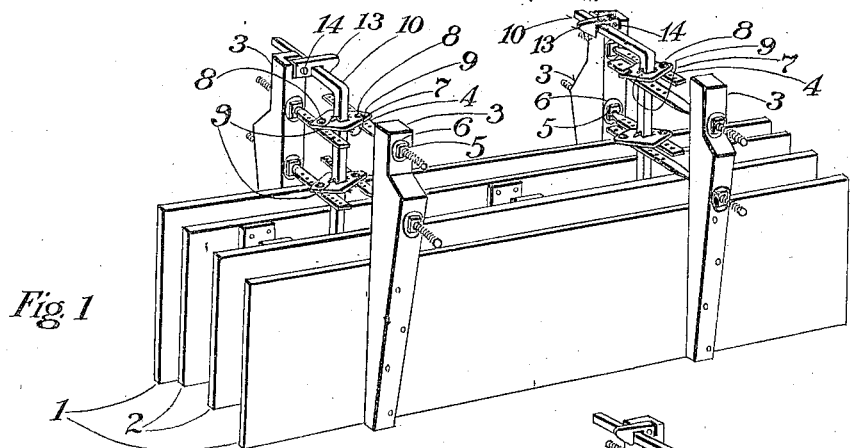
Figure 2:
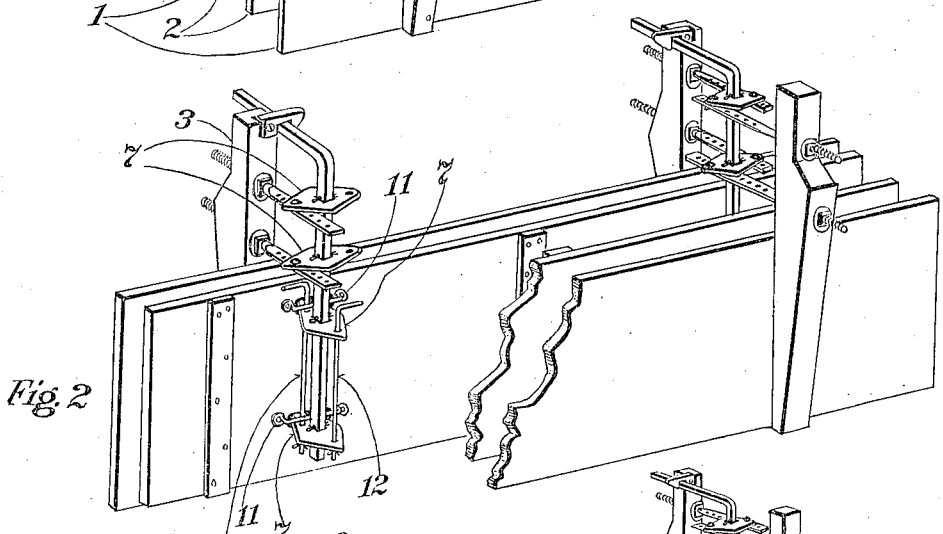
Figure 3:
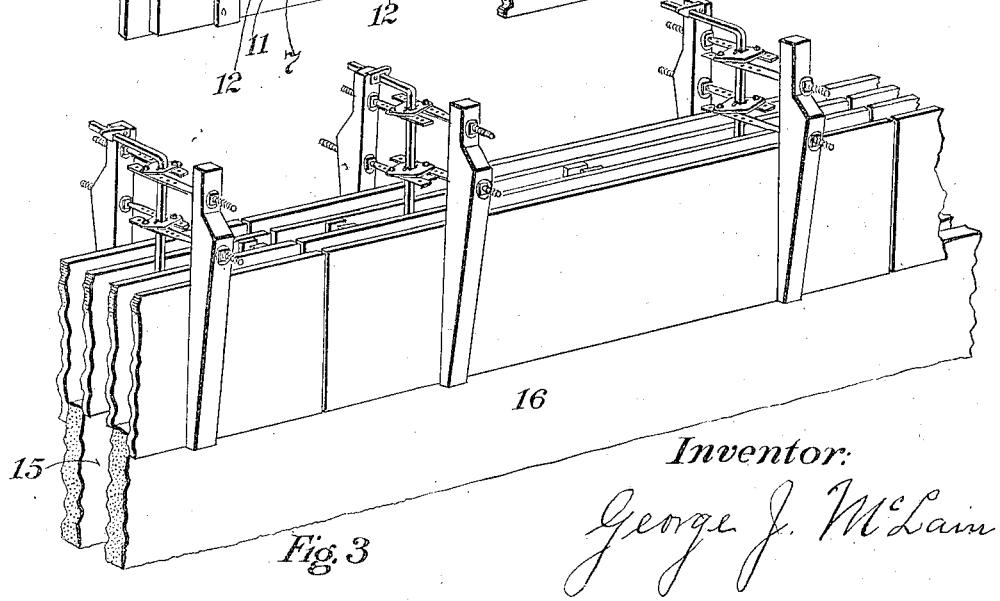

Fig. 1 is a perspective view of the assembled mold. Fig. 2 is a perspective view with parts cut away to show the mold clamping mechanism. Fig. 3 is a perspective view showing a number of molds in position for forming a hollow wall.

The invention relates to the building of concrete walls, especially hollow-wall concrete houses, by the use of adjustable molds built for repeated use and capable of speedy adjustment to walls of various thicknesses, these molds being constructed in assorted lengths so that a combination can be readily made for walls of any length.

A mold for making concrete walls, consisting of two outer 1 1 and two inner 2 2 mold members, made of wood or other material, the outer mold members being attached to upright posts 3 3 extending to a greater height than the mold members. The outer mold members are slightly deeper than the inner members and clamp securely to the outside of the finished wall 16, while the inner mold members rest upon the tie steel placed across the air space 15. Through two holes through each of posts 3 3, one hole being just above the top of the outer mold member and the other near the top of the post, is placed the threaded end of a rod 4 4 with nut 5 5 and washer 6 6 on same at both inner and outer edges of post for purposes of adjustment, the remaining portion of rod extending toward opposite outer mold member being flattened and containing a series of holes spaced at regular intervals for the purpose of changing size of mold to make walls of varying thickness. Two of these flattened rods extending from posts attached to opposite outer mold members are connected by a plate 7 having holes near each end corresponding in size to holes in rod, the connection being made by means of a loose rivet 8 extending through both plate and rod, said rivet being held in place by means of a cotter pin 9 extending through same. The perpendicular part of a lever 10, made of a square bar, extends through a square hole in the center of plate 7, connecting rods at top of posts, and also through plate connecting rods just above mold members, a cotter pin 9 being inserted in a hole through this vertical portion of lever immediately above and immediately below each plate. The square bar extends downward between the two inner mold members to a point just above the bottom of said inner mold members, passing through two additional plates like those above, except turned to the extent of 45 degrees, being transverse to mold members, one of these plates being just below the top and the other just above the bottom of inner mold members and being supported by a cotter pin extending through a hole in bar underneath each plate. (See Fig. 2.) Attached to inner mold members are iron loops 11 11 so placed that they will rest upon the ends of the two lower plates, a groove being cut underneath them in the inner mold member into which the end of plate extends to a point sufficient for hole in plate to correspond to space between mold member and loop. A rod 12 so bent at top that it will not drop through is inserted through upper and lower loops and hole in plate underneath each loop, thus holding the inner mold member in place. At top the horizontal portion of lever is so arranged that it will strike a post near top to which is attached a catch 13 by means of a screw 14 placed in such a way that it will automatically catch the lever and hold it when form is ready to be filled. The two upper plates being parallel with mold members and the two lower plates crosswise thereto causes one set to move in an opposite direction from the other when lever is turned. The posts to which the levers are caught are placed nearer end of its outer mold member than are posts on opposite outer mold member, and to compensate for longitudinal movement of one lever the neighboring lever works in opposite direction. Releasing the catch and turning lever away from the post causes the outer mold members to move outward and the inner mold members to move inward, thus freeing it from the wall 16, when it can be readily removed.

The form is operated by assembling a number of the forms of varying lengths end to end where the wall is to be constructed. (See Fig. 3.) They are then filled with a sloppy mixture of concrete, reinforcing steel being placed according to structural requirements. When concrete is sufficiently set the form is released by turning levers inward, thereby releasing it from the wall, when form is removed. Short pieces of tie steel are then laid from wall to wall across the air space 15 and forms are set on top of this and filled again.

I claim:

1. The combination, in an adjustable concrete mold, comprising a pair of outer mold members arranged for movement toward and from each other, a pair of inner mold members arranged for movement toward and from each other, a pair of flattened rods having a series of adjusting holes attached to each of two nearly opposite posts supporting outer mold members, plates for connecting these rods by means of rivets and cotter pins, like plates turned transversely connecting inner mold members by means of loops and rods, a common operating member fitting square holes in center of all of said plates, having a cotter pin immediately above and below each plate, for effecting movements of both inner and outer mold members in opposite directions, an operating lever, and catch attached to post for engaging operating lever, all substantially as set forth.

2. In an adjustable concrete mold, the combination of a common vertical operating member extending downward through four plates, the two upper plates parallel with form members and attached to adjustably spaced holes in rods by use of rivets and cotter pins for movement of outer mold members toward and from each other, the two lower plates being turned transversely to upper plates and attached to inner mold members by use of loops and rods for movement of inner mold members toward and from each other, an operating lever, and catch for engaging outer end of operating lever, effecting movements of inner and outer mold members in opposite directions.

3. An adjustable concrete mold, comprising of a pair of outer mold members and a pair of inner mold members, plates connecting inner mold members, end of plates entering recesses one near top and one near bottom in opposite inner mold members, the plates supporting weight of mold members by means of an iron loop attached to each inner mold member above each recess and resting on plate, said loop serving as a guide for a rod running behind an upper and lower loop through holes near ends of plate beneath each loop.

4. An adjustable concrete mold, comprising a pair of outer mold members arranged for movement toward and from each other, a pair of flattened rods with a series of adjusting holes attached to each of two nearly opposite posts supporting said mold members, plates for connecting these rods by means of rivets and cotter pins, a common operating member fitting square holes in center of said plates, having a cotter pin above and below each plate, an operating lever, and catch attached to post for engaging operating lever.

GEORGE J. McLAIN.